No. 811,069. PATENTED JAN. 30, 1906.
J. W. KENNEDY.
TURPENTINE GUTTER.
APPLICATION FILED JUNE 5, 1905.
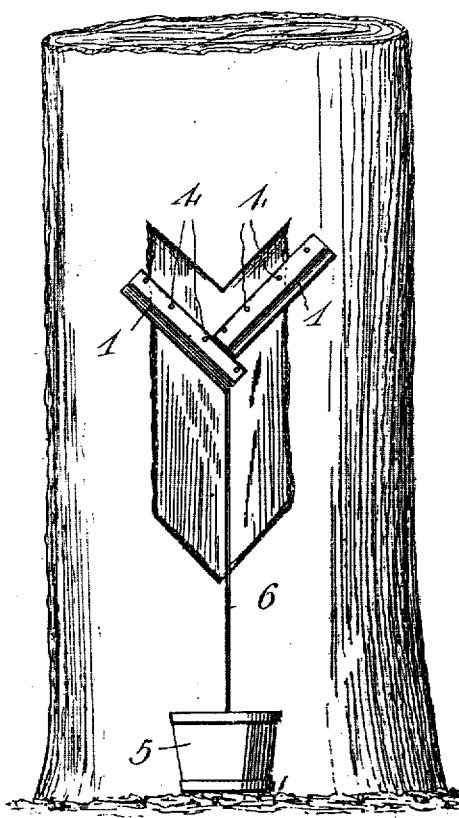
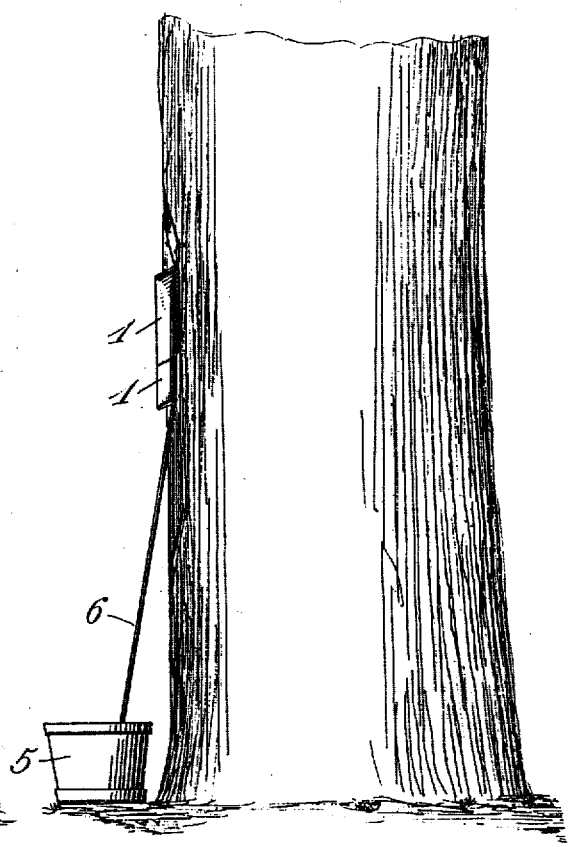
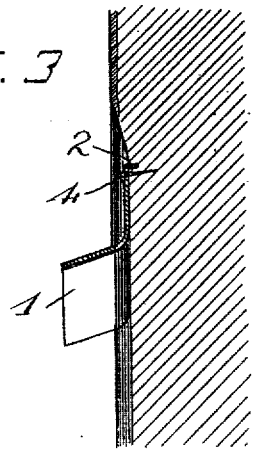
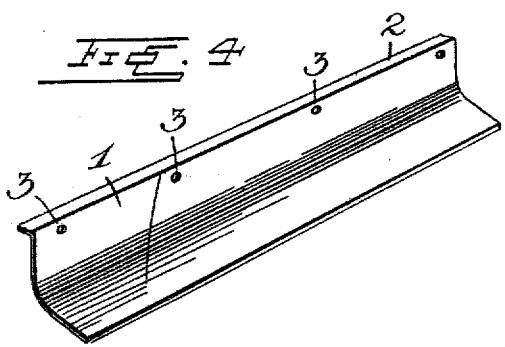
Witnesses
C. [illegible]
C. H. Griesbauer.
Inventor
John W. Kennedy
by H. B. Willson
Attorney

UNITED STATES PATENT OFFICE.

JOHN W. KENNEDY, OF CECIL, GEORGIA.

TURPENTINE-GUTTER.

No. 811,069.     Specification of Letters Patent.     Patented Jan. 30, 1906.

Application filed June 5, 1905. Serial No. 263,826.

*To all whom it may concern:*

Be it known that I, JOHN W. KENNEDY, a citizen of the United States, residing at Cecil, in the county of Berrien and State of Georgia, have invented certain new and useful Improvements in Turpentine-Gutters; and I do declare the following to be a full, clear, and exact description of the invention, such as will enable others skilled in the art to which it appertains to make and use the same.

This invention relates to improvements in turpentine-gutters.

The object of the invention is to provide a device of this character having means whereby the same is attached to a tree in such a manner that all of the sap or gum will be caught thereby and prevented from running beneath the gutter.

Another object is to provide means for conveying the gum or sap from the gutter to the receiving-box in a white and pure condition.

A further object is to provide a device of this character which will be simple and inexpensive in construction, efficient and reliable in use, and which may be quickly and easily attached to a tree without injuring the latter.

With the above and other objects in view the invention consists of certain novel features of constructon, combination, and arrangement of parts, as will be hereinafter described and claimed.

In the accompanying drawings, Figure 1 is a side view of a tree, showing the application of the invention thereto. Fig. 2 is a similar view taken at right angles to Fig. 1. Fig. 3 is a sectional view through a portion of a tree and one of the gutters or spouts, showing the manner of attaching the same to the tree; and Fig. 4 is a perspective view of one of the gutters removed.

In the embodiment of the invention I provide a pair of gutters 1, each of which is preferably formed of a strip of sheet metal which is bent longitudinally to form a trough or gutter and which has one of its edges bent at right angles to form an attaching-flange 2. In the side of the gutter adjacent to the flange 2 is formed a series of apertures or holes 3, adapted to receive tacks 4, by which said trough or gutter is secured to the tree. In applying the gutters to a tree the bark of the latter is cut away to form a V-shaped space, in which the gutters are arranged in an inclined position, as shown in Fig. 1 of the drawings. In thus arranging the gutters one of the latter is disposed below the other with its lower end slightly overlapping the lower end of the other gutter, whereby the sap or gum running into the upper gutter will be directed thereby into the lower gutter and together with the sap caught by said lower gutter will be conducted to a suitable box or receptacle 5 provided therefor.

In order that the sap caught by the gutters may be conducted to the box in a white and pure condition, a suitable conductor is provided, said conductor being here shown as being formed of a wire 6, the upper end of which is suitably connected to the lower end of the lower gutter, the lower end of the wire being suitably secured to the box or receptacle 5, whereby the sap or gum from said lower trough will run down the wire and into said box or receptacle.

In applying the gutters to the tree the same are arranged in their proper positions and tacks 4 are driven through the holes 3 and into the tree, and when said tacks are thus driven in the flanges 2 on the adjacent edges of the gutters will be embedded into the tree, thus forming a tight connection or joint between the gutter and tree, and thereby preventing any of the gum or sap from running under the trough or gutter, as is frequently the case with the common gutters now in use, which are at present attached to the tree by first forming an incision, into which the edge of the trough or gutter is slipped. This manner of attaching the gutter obviously weakens and injures the tree when continuously repeated, so that the same is in danger of being broken off by the wind. By attaching the gutters as herein shown and described this injury to the tree is obviated, and all that is required to keep the tree bleeding is to cut a thin sheaving on each side of the "peck" each week, the gutters below catching the gum or sap as it drips from the cut peck, the wire conducting said sap or gum to a box or other receptacle.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A device of the character described consisting of a pair of gutters, a right-angularly-disposed flange formed on one edge of said gutters, said flange being adapted to be forced into the tree, tacks or similar fastening devices adapted to be driven through said troughs under the flange and into the tree, and a guide-wire connected at one end to one of the troughs and its opposite end to a suitable receptacle whereby the sap will be conducted from said gutters to said receptacle, substantially as described.

In testimony whereof I have hereunto set my hand in presence of two subscribing witnesses.

JOHN W. KENNEDY.

Witnesses:
B. H. McLeod,
W. W. Banks.